United States Patent
Kollin

(10) Patent No.: US 7,569,077 B2
(45) Date of Patent: Aug. 4, 2009

(54) POSITION CONTROL FOR SCANNING PROBE SPECTROSCOPY

(75) Inventor: Adam Kollin, Troy, MI (US)

(73) Assignee: RHK Technology, Inc., Troy, MI (US)

( * ) Notice: Subject to any disclaimer, the term of this patent is extended or adjusted under 35 U.S.C. 154(b) by 221 days.

(21) Appl. No.: 11/763,677

(22) Filed: Jun. 15, 2007

(65) Prior Publication Data

US 2008/0308718 A1    Dec. 18, 2008

(51) Int. Cl.
G01N 13/12    (2006.01)

(52) U.S. Cl. .................. 850/19; 850/1; 850/2; 850/3; 850/4; 850/5

(58) Field of Classification Search ............. 250/306, 250/307; 73/105; 850/1, 2, 3, 4, 19; 977/849, 977/851, 850

See application file for complete search history.

(56) References Cited

U.S. PATENT DOCUMENTS

| | | | | |
|---|---|---|---|---|
| 5,077,473 A | * | 12/1991 | Elings et al. | 850/1 |
| 5,081,390 A | | 1/1992 | Elings | |
| 5,323,003 A | * | 6/1994 | Shido et al. | 850/1 |
| 5,569,918 A | | 10/1996 | Wang | |
| 5,866,806 A | * | 2/1999 | Samsavar et al. | 73/105 |
| 6,288,391 B1 | * | 9/2001 | Ushioda et al. | 850/4 |
| 6,353,219 B1 | * | 3/2002 | Kley | 250/234 |
| 6,583,411 B1 | * | 6/2003 | Altmann et al. | 850/4 |
| 6,608,307 B1 | | 8/2003 | Baur | |
| 6,713,761 B2 | * | 3/2004 | Nakada et al. | 850/1 |
| 7,034,298 B2 | | 4/2006 | Miyai et al. | |
| 7,100,430 B2 | | 9/2006 | Samsavar et al. | |
| 7,262,408 B2 | | 8/2007 | Asmussen et al. | |
| 7,297,946 B2 | * | 11/2007 | Xi et al. | 250/306 |

FOREIGN PATENT DOCUMENTS

WO    WO 2008/157373 A2    12/2008

OTHER PUBLICATIONS

PCT Int'l App. No. PCT/US2008/066949 Int'l Search Report and Written Opinion Dated: Dec. 17, 2008.

* cited by examiner

*Primary Examiner*—David A Vanore
*Assistant Examiner*—Michael Maskell
(74) *Attorney, Agent, or Firm*—Reising Ethington PC

(57) ABSTRACT

A method of position control for scanning probe spectroscopy of a specimen. Probe positional error is determined by comparing images generated from a sequence of scans to identify differences between positions of at least a portion of a reference characteristic of the specimen in the images. A probe is moved to a target location for spectroscopic analysis, as a function of the determined probe positional error.

29 Claims, 4 Drawing Sheets

POSITION CONTROL FOR SCANNING PROBE SPECTROSCOPY

TECHNICAL FIELD

The present invention relates generally to nanotechnology and scanning probe microscopy and, more particularly, to position control for scanning probe spectroscopy.

BACKGROUND

Scientists use scanning probe microscopes (SPMs) to reveal data about various properties of materials, such as gold or silicon, at very fine resolution, down to molecules and atoms of the materials. SPMs are a family of high magnification instruments that include Scanning Tunneling Microscopes (STMs), Atomic Force Microscopes (AFMs), Near Field Scanning Optical Microscopes (NSOMs), among others.

As an example, a typical STM may include a flat support upon which a material specimen is placed, and a small sharp probe suspended above the specimen by a piezoelectric tube. The probe has a tip so fine it is about the size of a single atom, and the piezoelectric tube can move the probe in step sizes smaller than the size of an atom. Voltage is applied to selected portions of the piezoelectric tube to expand or contract those portions so as to move the finely tipped probe vertically toward the specimen surface within a few diameters of an atom, and then scan over the specimen in a very precise lateral zig-zag pattern, side-to-side and up-and-down the specimen surface. The SPMs record physical interactions between the probe and the specimen surface as a function of the lateral and vertical position of the probe to create computer graphical images representative of the surface texture of the specimen. For example, voltage is applied across the STM probe and its electrically conductive specimen, to generate a tunneling current between the probe and specimen as the probe scans over the specimen. Then, command voltage to the vertical axis portion of the piezoelectric tube may be varied to maintain a constant tunneling current. Consequently, a digital image of the specimen surface may be recorded as variations in vertical probe position as measured by feedback voltage via the piezoelectric tube. This basic SPM technique is known as scanning probe topographic imaging.

In a more advanced SPM technique called scanning probe spectroscopy, spectroscopic analysis is typically conducted at a point location above the specimen surface. Spectroscopic analyses help extract more and different types of data from the surface than what is obtained from the basic scanning probe topographic imaging. For instance, spectroscopy may reveal data about local density of electronic states of the specimen, such as band gap qualities of a semiconductor. In a specific example of scanning tunneling spectroscopy, current may be measured as a function of variation in the voltage applied across a probe and specimen to yield a current-voltage curve, conductance-voltage curve, or the like. For this spectroscopic information to be relevant, the exact location where the spectroscopic data is collected must be accurately known.

In typical use, a topographic scan yields a topographic image, and then the probe is moved to a user-defined location within the topographic scan area above the specimen surface to conduct the spectroscopic analysis. A user may define a target location by using a computer mouse to move a pointer over a desired location on the previously acquired topographic image and clicking the mouse to select the desired location. The computer controller applies suitable voltage to the piezoelectric tube to move the probe to a position that corresponds with that location and the spectroscopic analysis is performed.

To improve the signal to noise ratio of spectroscopy, it is common to attempt many spectroscopic analyses at a target location and average the data together to yield an averaged spectroscopic analysis. But the problem with this approach is that the piezoelectric tube suffers from probe positional errors that may, for example, prevent the probe from actually arriving at and staying in the same exact target location on the specimen. In other words, probe positional errors that occur over the duration of several spectroscopic analyses will cause each spectroscopic analysis to be acquired at a different actual position. Thus, the averaged spectroscopic analysis data may not be truly representative of the spectroscopic characteristics of the specimen surface at the target location.

Such probe positional errors may include non-linearity, creep, hysteresis, and/or drift. Non-linearity means the movement of the piezoelectric elements does not respond linearly to the applied control signal. For example, application of a two volt signal to the piezoelectric element will not move the probe exactly twice the distance as application of a one volt signal. Creep means that the movement of the piezoelectric elements does not exactly follow the movement commanded by the controller. For example, each movement command of the probe toward a target position results in the piezoelectric elements moving the probe asymptotically toward the commanded target position, such that the probe always falls just short of reaching the command target position. Hysteresis means that when the piezoelectric elements are energized to move the probe from a starting position to a target position, the probe advances along a path toward the target position but does not actually return along the same exact path or to the same starting point when the piezoelectric elements are deenergized. Drift means that changes in ambient conditions such as temperature around the probe and sample affect both the motion of the piezoelectric elements as well as the overall position of the probe.

What's worse, in certain SPM applications the exact position of the probe cannot be known with atomic precision, thereby preventing accurate correlation between the spectroscopic analysis and the target location of the surface. For example, certain SPM applications involve extremely harsh environments in which probe position feedback devices are not economically feasible. In other SPM applications below the 10 nm scale, typical probe position feedback devices, such as laser based devices, are not technically feasible.

BRIEF SUMMARY

In accordance with one aspect of the invention, there is provided a method of position control for scanning probe spectroscopy of a specimen. Probe positional error is determined by comparing images generated from a sequence of scans to identify differences between positions of at least a portion of a reference characteristic of the specimen in the images. A probe is moved to a target location for spectroscopic analysis, as a function of the determined probe positional error.

BRIEF DESCRIPTION OF THE DRAWINGS

Features and advantages of the present invention will be apparent to those of ordinary skill in the art from the following detailed description of preferred exemplary embodiments and best mode of the invention and the claims, with reference to the accompanying drawings in which:

DETAILED DESCRIPTION OF PREFERRED EMBODIMENT(S)

In general, a system and method will be described in one or more illustrative and presently preferred embodiments of scanning probe microscopy that includes determining probe positional error and moving a probe relative to a specimen in accordance with the determined probe positional error. The various embodiments will be described with reference to use in an exemplary generic SPM system. However, it will be appreciated as the description proceeds that the invention is useful in many different applications and may be implemented in many embodiments such as Scanning Tunneling Microscopes (STMs), Atomic Force Microscopes (AFMs), Near Field Scanning Optical Microscopes (NSOMs), or any other nanotechnology analysis devices.

Exemplary System

Figure 1:
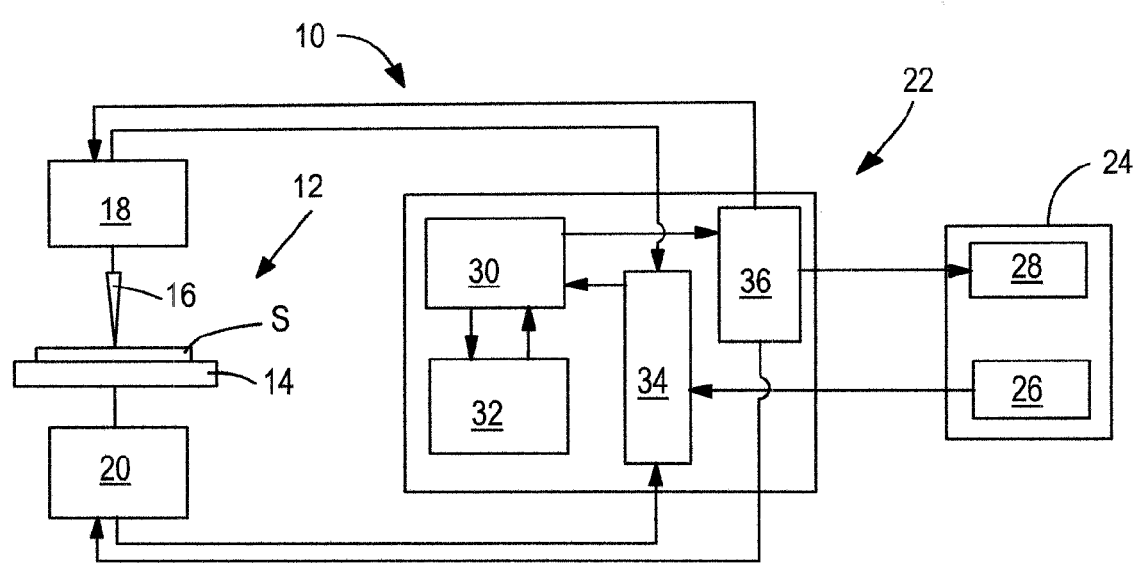
FIG. 1 is a schematic view of an exemplary form of a scanning probe microscope system.

Referring specifically to the drawings, FIG. 1 illustrates a presently preferred embodiment of a scanning probe microscope system 10 for analyzing a specimen S. The specimen S may be any material suitable for physical analysis including, for example, topographic and/or spectroscopic analysis, such as scanning probe spectroscopy. As used herein, the term analysis may also include recording, measuring, or the like. The system 10 may include at least a portion of a scanning probe microscope 12, which may include a support 14 to carry the specimen S, and a probe 16 disposed above the specimen S in any suitable manner to scan and spectroscopically analyze the specimen S. Of course, the probe 16 could be disposed under the specimen S or to the side of the specimen S. Any orientation of the probe 16 and specimen S is contemplated.

The microscope 12 may also include a probe scanner 18 to carry and move the probe 16, and may also or instead include a support scanner 20 to carry and move the support 14. The scanners 18, 20 may move in any suitable directions including vertical and/or lateral directions, which may include any of orthogonal X, Y, and/or Z axes. The scanners 18, 20 may be any suitable devices to move the probe 16 relative to the specimen S. For example, the scanners 18, 20 may include piezoelectric devices such as piezoelectric tubes, cantilevered beams, shear piezoelectric elements, or the like. An exemplary scanning probe head is disclosed in U.S. Pat. No. 5,569, 918, which is assigned to the assignee hereof and is hereby incorporated by reference in its entirety herein.

The system 10 may further include a computer 22 to process data and software, and user interface devices 24 to enter and receive data and information to and from the computer 22. The computer 22 may include a machine controller of the SPM 12, a separate personal computer or other computing device, or both. The user interface devices 24 may be part of the computer 22 and may include any suitable input device(s) 26, which may include keyboards, modems or other communication devices, pointing devices (such as a mouse, a touchscreen, a lightpen, joystick, or the like), or other input devices to enter commands and information into the computer 22. The user interface devices 24 may also include any suitable output device(s) 28, which may include one or more printers, video or graphical displays or monitors, or other output devices to communicate information to a user or a device.

The computer 22 may be responsible for receiving input from the various input devices 26, processing instructions for carrying out aspects of SPM and transmitting output to the various output devices 28. The computer 22 may be in communication with the scanners 18, 20 and may receive feedback signals therefrom and transmit control signals thereto. The computer 22 may also be in communication with other devices (not shown), depending on the type of SPM system being used, such as voltage regulators and/or drivers, optical devices and/or drivers, and the like. To facilitate such functionality, the computer 22 may include one or more processors 30, memory 32 in communication with the processor(s) 30 such as internal memory and/or external memory, input device interfaces 34, and output device interfaces 36. The computer may also include any other devices such as clocks, power supplies, interfaces, and the like (not shown). The computer 22 may run any suitable imaging software, for example, SPM32 or XPM PRO brand software available from the assignee hereof, or other like software.

The processor(s) 30 may be configured to execute software, which may include control logic, algorithms, instructions, or the like that provides at least some of the functionality of the SPM system 10. In this respect, the processor(s) 30 may encompass one or more processing units, controllers, microprocessors, micro-controllers, discrete logic circuit(s) having logic gates for implementing logic functions upon data signals, application specific integrated circuits (ASIC) with suitable logic gates, complex programmable logic devices (CPLD), programmable or field-programmable gate arrays (PGA/FPGA), any combinations of the aforementioned, and the like.

The memory 32 may be media configured to provide at least temporary storage of data, and/or computer software or computer-readable instructions that provide at least some of the functionality of the SPM system 10 and that may be executed by the processor 30. The memory 32 may include computer readable storage or media in the form of removable and/or non-removable, volatile memory and/or non-volatile memory. Exemplary volatile memory may include random access memory (RAM), static RAM (SRAM), dynamic RAM (DRAM), and the like, for running software and data on the processor. Exemplary non-volatile memory may include read only memory (ROM), erasable programmable ROM (EPROM or EEPROM), dynamic read/write memory like magnetic or optical disks or tapes, and static read/write memory like flash memory, for storing software and data.

Computer programs or software may include executable instructions for implementing logical functions and can be embodied in any computer-readable medium for use by or in connection with the processor 30, which can retrieve and execute the instructions. The software may include, but is not limited to routines, modules, objects, components, data structures, and the like, for performing particular tasks and/or implementing particular abstract data types. Computer programs may exist in a variety of forms both active and inactive. General examples include software programs comprised of instructions in source code, object code, executable code or other formats; firmware programs; or hardware description language (HDL) files; and the like. Specific examples include assembler, C, C++ objects, Visual Basic, Visual C++, XML, Java, Microsoft® Foundation Classes, PERL, PHP, SQL, and the like.

The computer 22 is adapted to use at least some form of computer readable media, which may include volatile and/or non-volatile media, removable and/or non-removable media, and which may be any suitable medium that may be accessed by a computer. By way of example and not limitation, computer readable media include computer storage media, communication media, and any combination thereof. Such media may contain, store, and/or carry instructions or programs for implementing some or all of the method steps described below in conjunction with the processor 30.

Computer storage media may be used to distribute computer programs locally and may include volatile and non-volatile, removable and non-removable media implemented in any method or technology for storage of information such as computer readable instructions, program modules, data structures, other data, and the like. More specifically, computer storage media may include RAM, ROM, EEPROM, flash memory or memory sticks, integrated circuits, CD-ROM, digital versatile disks (DVD) or other optical disk storage, magnetic cassettes, magnetic tape, magnetic disk storage or other magnetic storage devices, or any other medium that may be used to store the desired information and that may be accessed by a computer.

Communication media may embody computer readable instructions, program modules, data structures, other data, and the like, in a compressed or uncompressed data signal such as a carrier wave or other transport means, and include any information delivery media. Those skilled in the art are familiar with modulated data signals, which have one or more characteristics set or changed in such a manner as to encode information in the signals. In any event, exemplary computer readable signals, whether modulated using a carrier or not, are signals that a computer system hosting or running a computer program can be configured to access, including signals downloaded using the Internet or other networks. Wired media such as a wired network or direct-wired connection, and wireless media such as acoustic, RF, infrared, and other wireless media, are examples of communication media.

At least some portion of the SPM methods may be practiced locally or in a distributed computing environment where tasks may be performed by remote computers or processing devices that are linked through a communications network, such as a LAN, WAN, or the like. In a distributed computing environment, program modules may be located in both local and remote computer storage media including memory storage devices. Thus, it is to be understood that the SPM methods may be performed by any computing devices suitable for executing one or more of the specified functions, using any media and being located anywhere.

Exemplary Method

A method of position control for scanning probe spectroscopy is provided herein and may be carried out using one or more computer programs within the exemplary operating environment of the SPM system 10 described above. Those skilled in the art will also recognize that the method can be carried out within other operating environments.

The method is provided to improve position control by correcting for positional error of a probe relative to a specimen. Corrections may be carried out before and between spectroscopic analyses and as a function of positional differences between a reference characteristic in a sequence of scans and as may be manifest in a sequence of images corresponding to the sequence of scans. In general, the method correlates a position of a spectroscopic measurement in reference to a location of the reference characteristic. The reference characteristic may be any characteristic that may be used as a reference for spectroscopic analysis, such as any electrical, mechanical, optical, acoustic, chemical, or like characteristics. More specifically, the reference characteristic may be any condition, property, or relation, such as size, shape, distance, mass, temperature, force, power, voltage, current, light, properties of matter, materials, and devices, or any other quantities, parameters, variables, or the like. In a typical example, the reference characteristic may be a topographical reference feature such as a surface bump, step, or hole. But any other types of reference characteristics are also contemplated.

Accordingly, position control performance may be increased by such an improvement in probe positional error correction because the method is carried out in relation to a relatively fixed or stationary reference characteristic. Thus, an SPM user can maintain a position of a probe during spectroscopy with greater accuracy than ever before.

Figure 2A:
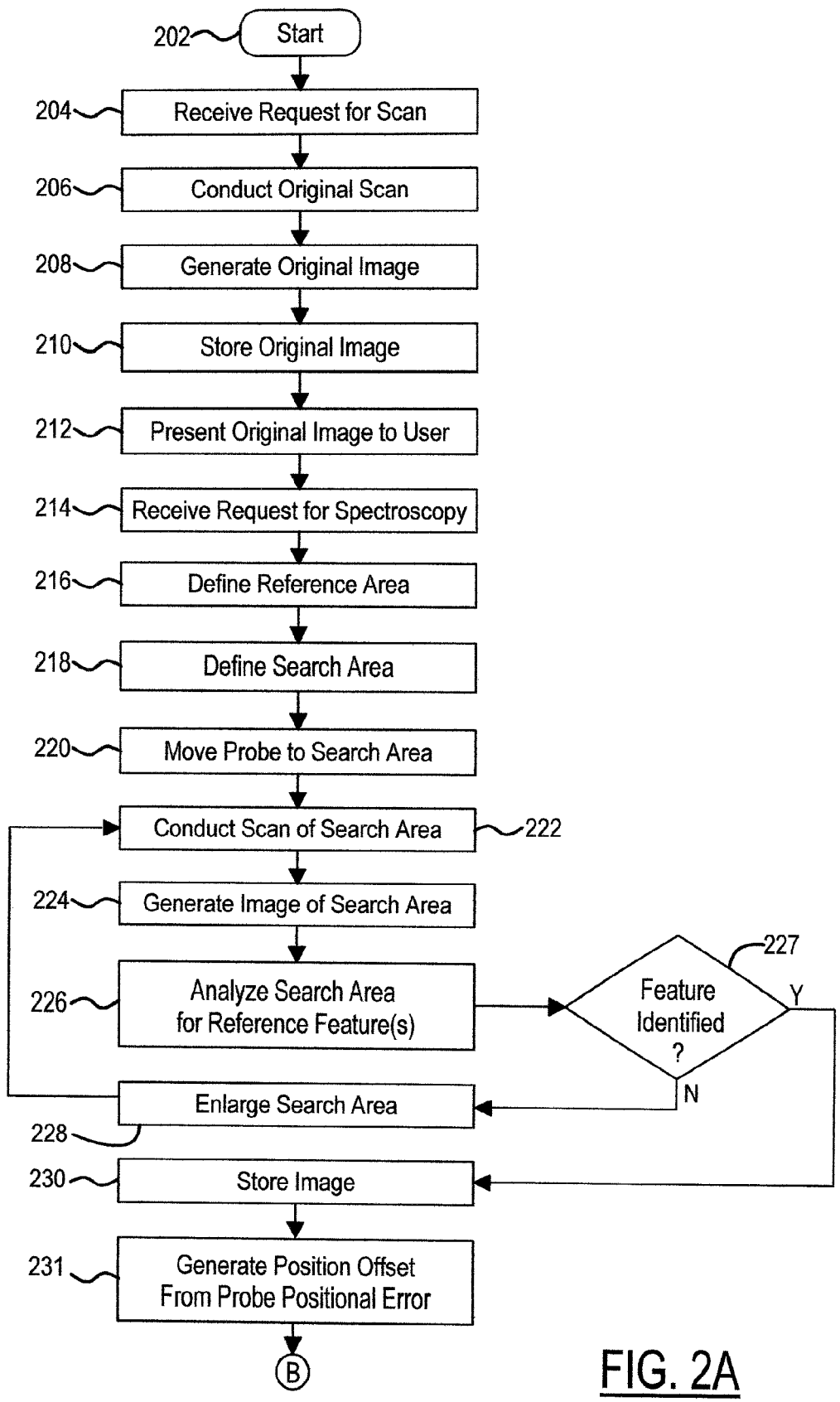
FIGS. 2A and 2B are a flow chart illustrating an exemplary method of position control for scanning probe spectroscopy.
Figure 2B:
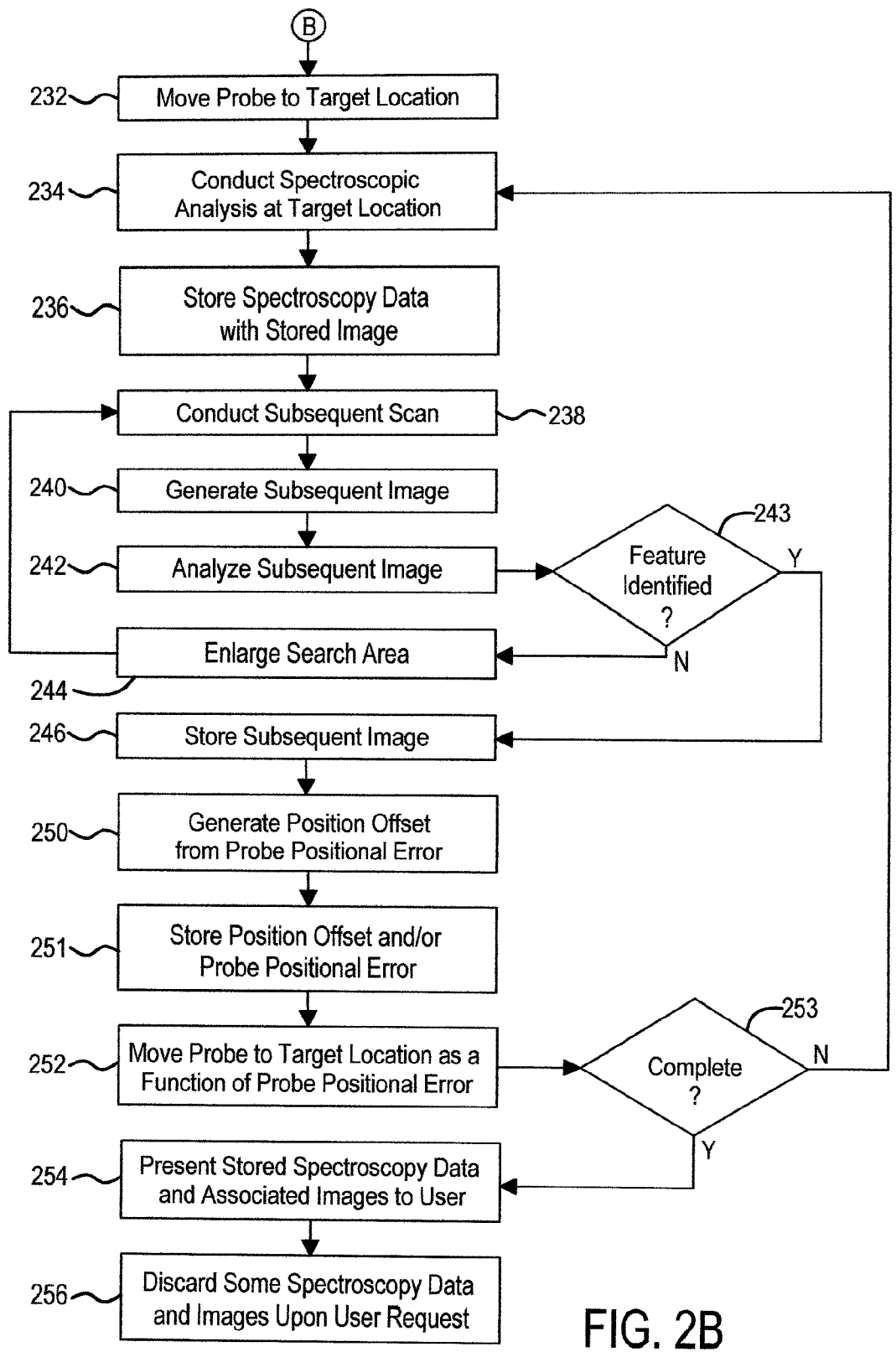
Figure 3:
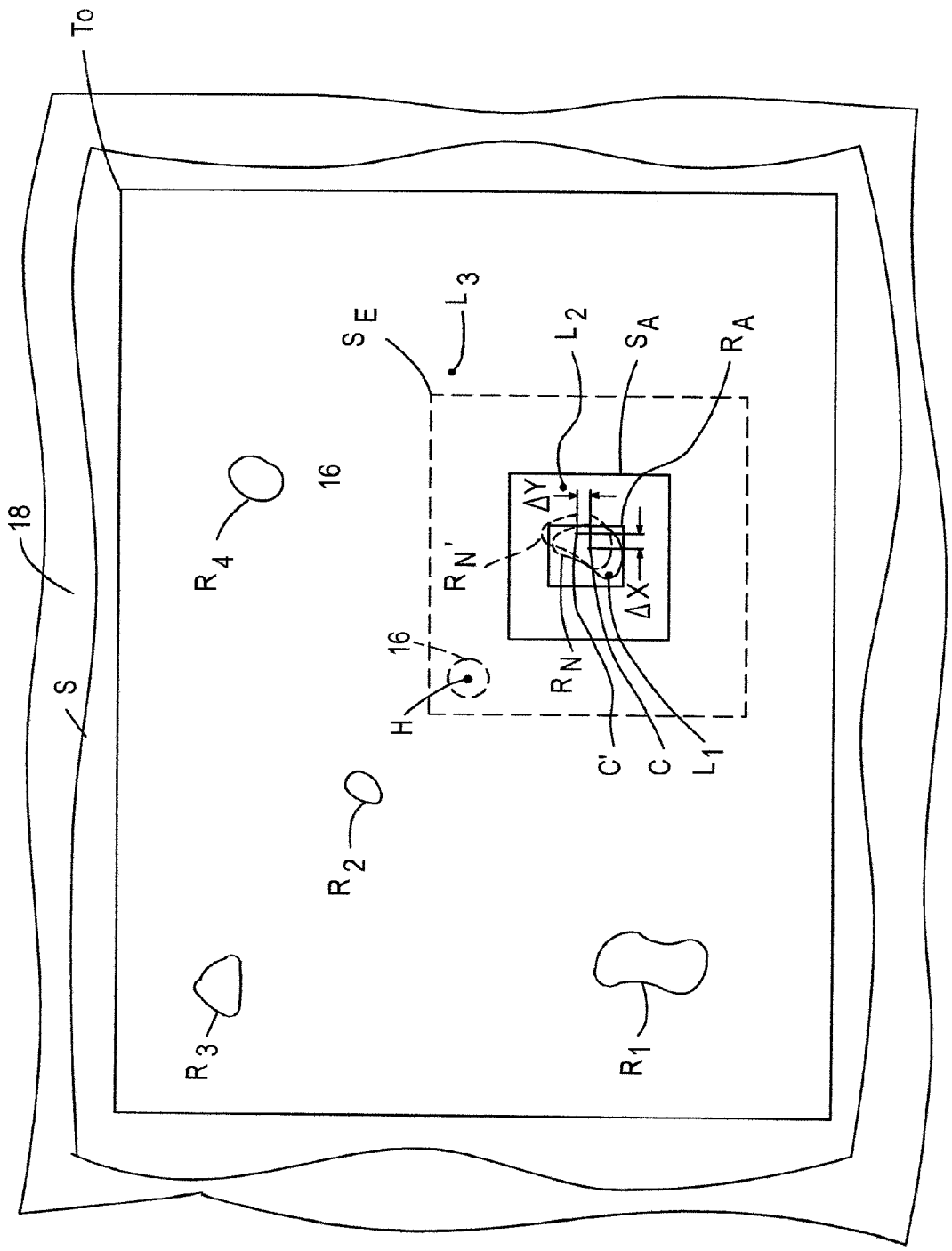
FIG. 3 is a diagram schematically illustrating portions of the method of FIGS. 2A and 2B.

FIG. 2 illustrates an exemplary method 200 of position control for scanning probe spectroscopy, as discussed in detail below. Also, portions of the method 200 will be described in reference to FIGS. 1 and 3. The method steps may or may not be sequentially processed, and the invention encompasses any sequencing, overlap, or parallel processing of such steps.

Although the method 200 will be described in relation to position control of a movable probe, those skilled in the art will recognize that the method 200 may include position control of a movable specimen support relative to a stationary probe, and position control of a movable specimen support and movable probe. Thus, those skilled in the art will realize that references to a probe being moved relative to a movable or stationary specimen support essentially may be equivalent or the same as a specimen support being moved relative to a movable or stationary probe.

At step 202, the method 200 is started in any suitable fashion. For example, a user may select a spectroscopy function of software for the SPM system 10.

At step 204, a request may be received from a user for global analysis of a specimen over a global scan area of the specimen. For example, the user may desire to conduct some type of physical analysis such as topographic analysis and may select a topographic scan function of software loaded to the SPM system 10. Topography is just one of many possibilities for the global analysis, and any other types of analyses may be used that allow features to be usefully distinguished or recognized. For example, the global scan may also or instead include STM current and/or conductivity scans, atomic force microscopy (AFM) scans, tapping phase scans, pulse counting data scans, and/or the like.

In any case, an exemplary global scan area To may be defined on a portion of a specimen S. The global scan area To may be of any size and shape, but an exemplary area may be on the order of a 20×20 nm square. The global scan area To may be set by the user or may be a default area, or the like.

At step 206, a global scan may be conducted, such as in response to a request from a user. For example, in response to the request from step 204, the processor 30 may run suitable scan instructions to direct the microscope 12 to move the probe 16 relative to the specimen S over the global scan area $T_O$. A standby or home location H of the probe 16 relative to the specimen S is illustrated on the global scan area $T_O$. After the global scan is conducted, the probe 16 may be in or moved to the home location H, which may be defined in any suitable location, but preferably over the specimen S such as at a central location $T_O$ of the scan area $T_O$ as shown.

At step 208, a global image may be generated from a global scan, such as the global scan from step 206. For example, the processor 30 may execute suitable image generation instructions stored in memory to generate the global image from the global scan conducted in step 206. The scanning and imaging may reveal several features $R_1$-$R_N$ that a user may desire to use as one or more references in spectroscopically analyzing the specimen S. As used herein, the term "image" may include an analog or digital electronic manifestation of one or more physical characteristics, and may be stored in a computer data file, presented via a computer display, or the like. Those skilled in the art will recognize that steps 206 and 208 may be combined or may be performed simultaneously.

At step 210, a global image may be stored. For example, the global image generated in step 208 may be stored in the memory 32 of the computer 22.

At step 212, a global image may be presented to a user. For example, the processor 30 may retrieve the global image stored in step 210 from the memory 32 and transmit it via the interface(s) 36 to the output device(s) 28, such as a video display for viewing by the user. In another example, the global image may be streamed to the video display as it is being generated, for example, line by line.

At step 214, a request may be received from a user for spectroscopic analysis of a portion of a specimen at one or more target locations within a global scan area. For instance, the user may use the input and output device(s) 26, 28 to select the target location(s), such as by a "point and click" operation. More specifically, the user may move a mouse to move a graphical pointer on a video display to a virtual target location on the video display that corresponds to an actual target location on the specimen, and may then press a button on the mouse to select the target location. In one example, the target location may include the reference characteristic $R_N$, or some portion thereof such as a spectroscopic point $L_1$ on the reference characteristic $R_N$. For instance, the reference characteristic $R_N$ may be a feature from a global scan such as an apparent bump, step, or hole of the specimen S. In another example, the target location may be proximate the reference characteristic $R_N$, such as a spectroscopic point $L_2$ or another spectroscopic point $L_3$, and within about a few nanometers thereof, such as on the order of about 0 to 10 nm.

According to another example, the user may request spectroscopy by generating a target list of one or more spectroscopy target locations. The user may generate the list by interactively designating regions of interest similar to that described above, or by requesting a predefined pattern of target locations such as via a grid, matrix, or points along a line. For example, the pattern may include equidistantly spaced points, randomly spaced points, or points designated by the user. Alternatively, the scanning software may be programmed to generate a series of spectra, for example, at different Z values at one or more target locations. In any case, one or more spectra may be recorded at each target location according to user instructions.

At step 216, a reference area may be defined, wherein the reference area may be located around a target location and may include at least a portion of a reference characteristic. An exemplary reference area $R_A$ is illustrated within the global scan area $T_O$ and surrounding the reference characteristic $R_N$ and, for example, may be on the order of a 1×1 nm square.

In a first example, the user may define the reference area $R_A$ with a box around the reference characteristic $R_N$, such as with a "point, click and drag" operation. More specifically, the user may move a mouse to move a graphical pointer on a video display to a virtual corner point of a virtual reference area on the video display that corresponds to a point on the specimen, and may then press and hold a button on the mouse to select the virtual corner point. The user may thereafter drag the mouse to move the pointer to an opposite virtual corner point, and then release the button to define the reference area $R_A$.

In a second example, the user may define the reference area $R_A$ by selecting a center of the virtual reference area, dragging the mouse outwardly to an outer perimeter of the virtual reference area, and then releasing the mouse button to establish the reference area size.

In a third example, the user may define the reference area $R_A$ with an outline of the reference characteristic $R_N$. More specifically, the user may drag a mouse to a point on a perimeter of the reference characteristic $R_N$, press and hold a button on the mouse while moving the mouse so that its pointer draws a virtual outline of the reference characteristic $R_N$, and then release the button.

In a fourth example, the processor 30 may execute suitable instructions to calculate an area smaller than the global scan area $T_O$, but greater than or equal to the size of the reference characteristic $R_N$, and including at least a portion of the reference characteristic $R_N$. More specifically, the computer may be configured to run any suitable image analysis software, which may include blob finder functionality to identify the reference characteristic $R_N$. Such computer programs are well known to those of ordinary skill in the art. The reference area may be of any suitable size and shape. Moreover, the reference area $R_A$ may be defined as a function of the size of the global scan area $T_O$, and/or the distance between a current position of the probe 16 and the target location $L_1$. The current position of the probe 16 may include the home location H, or an upper left origin location, or any other corner location of the global scan area $T_O$. For example, the function may be proportional, wherein the larger the global scan area $T_O$, the larger the reference area $R_A$ may be. In another example, the function may be proportional, wherein the greater the distance between the current position of the probe 16 and the target location $L_1$, the larger the reference area $R_A$ may be.

At step 218, a search area may be defined, wherein the search area includes a reference area. An exemplary search area $S_A$ is illustrated within the global scan area $T_O$ and surrounding the reference area $R_A$ and, for example, may be on the order of a 2×2 or 3×3 nm square. The processor 30 may execute suitable instructions to calculate the search area $S_A$ to be smaller than the global scan area $T_O$ but greater than or equal to the size of the reference area $R_A$, such that the reference area $R_A$ is contained within the search area $S_A$. The search area $S_A$ may be of any suitable size and shape. Also, the size of the search area $S_A$ may be defined as a function of the size of the global scan area $T_O$, the size of the reference area $T_O$, and/or the distance between a current position of the probe 16 and the target location $L_1$. In a particular example, the function may be according to a proportional relationship.

At step 220, a probe may be moved to a search area. For example, the processor 30 may execute suitable probe movement instructions to generate suitable command signals for transmission from the computer 22 to the microscope 12 to actuate one or both of the scanners 18, 20 to move the probe 16 from a present location, such as its home location H, to a point of the search area $S_A$.

At step 222, a local scan of a search area may be conducted. For instance, the local scan may include any suitable type of physical analysis such as topographic analysis. In one example, the processor 30 may execute suitable scanning instructions to generate suitable command signals for transmission from the computer 22 to the microscope 12 to actuate one or both of the scanners 18, 20 to move the probe 16 from a point of the search area $S_A$ back and forth across and along the search area $S_A$ in any suitable pattern, for example, raster, comb, circular, or other like pattern.

At step 224, an image of a search area, or portion thereof, may be generated from a local scan of the search area. For example, the processor 30 may execute suitable image generation instructions stored in memory to generate the image from the local scan of the search area $S_A$ conducted in step 222.

At step 226, one or more images of a search area, or portion(s) thereof, may be analyzed in an attempt to qualify or identify a reference characteristic, and/or identify differences between positions of at least a portion of the reference characteristic, for example, to determine probe positional error. For example, the processor 30 may execute suitable reference characteristic finding instructions stored in memory. More specifically, any suitable pattern matching software may be used, and may include autocorrelation algorithms, fast Fourier transform (FFT) algorithms, blob finder algorithms, orbital tracking algorithms, or the like.

For instance, to find a top of a three-dimensional reference characteristic the processor 30 may execute an orbital tracking algorithm to orbit the probe 16 around at least a portion of the reference characteristic to establish and measure the slope of a plane defined by the orbit. If the slope of the plane is non-zero, then it is understood that the orbit is of a side portion of the reference characteristic. Therefore, the orbit is adjusted until the slope of the plane becomes zero, such that the probe is understood to be orbiting around the reference characteristic at the top thereof.

Also, or instead, a hypothesis or potential reference characteristic may be discovered for comparison with a known reference characteristic, and a parameter value of the potential reference characteristic may be compared to a predetermined threshold value. Thereafter, the potential reference characteristic may be identified as being the known reference characteristic, if the compared parameter value is greater than or equal to the predetermined threshold value.

Moreover, images generated from the global scan and the local scan may be compared to identify differences between positions of a reference characteristic in the images to determine the probe positional error. Those skilled in the art will recognize that the terminology probe positional error essentially may be the same as specimen support positional error for reasons stated previously.

In one embodiment, the positions of at least a portion of the reference characteristic $R_N$, $R_N'$ in images from steps 206 and 224 may be compared. More particularly, the reference characteristic $R_N$ in the image from the global scan of step 206 and a shifted version of the reference characteristic $R_N'$ in the subsequent image from step 224 may be analyzed to identify a common actual or theoretical point C (and shifted version C') of the reference characteristic $R_N$, $R_N'$.

More particularly, the processor 30 may execute suitable image analysis instructions to identify corresponding centroid points of the reference characteristics $R_N$, $R_N'$, center points of boxes outlining the reference characteristics $R_N$, $R_N'$, or the like. Such points are common between the images and dimensional differences therebetween can be calculated as the probe positional error. Lateral X and Y axis distances $\Delta x$ and $\Delta y$ between a centroid point of an image and a corresponding centroid point of a subsequent image can be determined.

According to another embodiment of identifying differences between positions of at least a portion of a reference characteristic in a sequence of images, the reference area $R_A$ of size RX, RY may be positioned at an offset $dX_R$, $dY_R$ from an origin of the search area $S_A$ of size SX, SY, such that $RX+dX_R<SX$ and $RY+dY_R<SY$. The origin may be an upper left corner of the search area $S_A$, or any other suitable location on or encompassed by the search area $S_A$. The search area $S_A$ may be scanned, a baseline reference image from the scan may be generated, and average values of scan lines in a fast-scan direction of the baseline reference image may be set to zero, so as to suppress low frequency noise, effects of Z drift, or the like.

A subsequent scan of the search area may be conducted, and a plurality of sub-search-area or reference images may be extracted or generated from the subsequent scan, wherein the reference images are obtained as offsets or deviations dX, dY from the search image origin for each value of $dX >/= 0$ and $<SX-RX$, and for each locational value of $dY >/= 0$ and $<SY-RY$, wherein those locational values may be integers or any other predetermined value increments. An average scan value of each line in a fast-scan direction of each of the sub-search area images may be set to zero. The scan values may include any suitable parameter including Z axis height, current, temperature, pixels, or the like. An error function E(dX, dY) may be calculated as equal to a sum of absolute values of differences between corresponding values (such as pixels) of the baseline image and each of the plurality of reference area images. The reference area image having values of dX, dY that minimize the error signal or function is considered as being the best fit reference area image. Thereafter, a probe position offset or correction may be generated according to $(dX-dX_R, dY-dY_R)$.

Those skilled in the art will recognize that various other error functions could be used such as sum of pixel differences squared, sum of products of pixels (autocorrelation), or the like. Also, those skilled in the art will recognize that this embodiment is equally applicable to determining probe positional error between global and local scans, and/or between successive local scans.

At step 227, it may be determined whether or not a reference characteristic has been identified. If not, the method proceeds to step 228, and if so, then the method proceeds to step 230.

At step 228, if a reference characteristic is not identified in an image, then a search area may be enlarged. Thereafter, the method may loop back to step 222, wherein steps 222 through 227 may be repeated until the reference characteristic is identified. The enlarged search area may be of any suitable size and shape. Also, the enlarged size of the search area may be defined as a function of the size of the global scan area, and/or the size of the reference area. An exemplary enlarged search area $S_E$ is illustrated within the global scan area $T_O$ and surrounding the previous search area $S_A$ and, for example, may be on the order of a 4×4 or 9×9 nm square.

At step 230, one or more images of or within a search area may be stored, and reference position offsets may be reset. For example, the image of the search area $S_A$ generated in step 224 may be stored in memory. The stored image may include the entire search area $S_A$, or just a portion of the search area $S_A$ such as the reference area $R_A$ or the reference characteristic $R_N$ within the reference area $R_A$. Also, $\Delta x$ and $\Delta y$ position offsets for the reference area $R_A$ may be set to a zero value or some other suitable default value.

At step 231, a position offset may be generated from a probe positional error. For example, the processor 30 may use the probe positional error determined in step 226 to generate the position offset. The position offset may be a set of lateral X and Y axis dimensional values, such as values with the same magnitude of the probe positional error values from step 226 but with opposite direction. Instead, the position offset values may be greater than the error values from step 226, such as to correct for scanner creep. Similarly, the position offset values may be lesser than the error values from step 226, such as to prevent overshoot. Such greater or lesser values may be generated by adding or subtracting predetermined adjustment values to or from the probe positional error values.

At step 232, a probe may be moved to a target location. For instance, the processor 30 may execute suitable probe movement instructions to generate suitable command signals for transmission from the computer 22 to the microscope 12 to actuate one or both of the scanners 18, 20 to move the probe 16 to one of several possible spectroscopy points $L_1, L_2, L_3$, or the like. In one example, a probe may be moved to a target location as a function of determined probe positional error, such as using a position offset generated from the determined probe positional error. More specifically, the processor 30 may execute suitable probe movement instructions to generate suitable command signals for transmission from the computer 22 to the microscope 12 to actuate one or both of the scanners 18, 20 to move the probe 16 from its current location to one of the target locations $L_1, L_2, L_3$, or the like.

In so doing, the processor 30 may calculate nominal or gross lateral X and Y axis command signals and then adding, subtracting, multiplying, or dividing the position offset from step 231 with respect to the nominal command signals to yield adjusted or net lateral X and Y axis command signals. In one example, in the case of a move from the home location H or the current search area $S_A$ location to one of the target locations $L_1, L_2, L_3$, the probe 16 may be commanded to move to the target location(s) $L_1, L_2, L_3$, +/− the positional error offset. In a more particular example, in the case of a first move to a first target location, the probe may be commanded to move +/− the zero or default values for the Δx and Δy offsets stored in step 230. For subsequent moves, presumably the Δx and Δy offsets may be non-zero or deviated from the default values.

At step 234, a spectroscopic analysis of a specimen may be conducted at a target location, which may be an only target location, a first of several target locations, or any of a series of target locations. For example, the processor 30 may execute suitable spectroscopy instructions stored in memory to carry out one or more of the following spectroscopic analyses I-V, dv/dt, I(z), or the like, at one of the several possible spectroscopy points $L_1, L_2, L_3$, or the like.

Moreover, probe position may also be corrected as the spectroscopic analysis is being conducted. This is particularly desirable for spectroscopic analyses that take a relatively long time to conduct. In one example, once probe positional error has been calculated such as in step 242 below, that error, and/or offsets generated from that error from step 250 below, may be used to move the probe to maintain it over the target location. For instance, the probe positional error may be relatively predictable as to magnitude and direction as a function of time. In such cases, the probe may be moved in the predictable direction and according to the predictable magnitude or rate so as to maintain the probe over the target location. The processor 30 may execute suitable probe movement instructions to generate suitable command signals for transmission from the computer 22 to the microscope 12 to actuate one or both of the scanners 18, 20 to move the probe 16 from its current location in accordance with the predictable magnitude and direction.

At step 236, data from a spectroscopic analysis may be stored in association with a stored image as a confirmation of where the spectroscopic analysis was conducted. For example, data from the spectroscopic analysis of step 234 may be associated and stored with the stored image(s) from step 230 in any suitable manner. In a more particular example, data from the spectroscopic analysis of step 234 may be associated and stored with the stored image of the reference area $R_A$ from step 230, such as in the memory 32 of the computer 22.

At step 238, a subsequent local scan may be conducted of least a portion of a previously defined search area. For example, the subsequent local scan may be conducted of the search area(s) $S_A$, $S_E$ defined over steps 218-230. In another example, where the method 200 has already proceeded to step 252, the size of the search area may be adjusted for a subsequent spectroscopic analysis, as a function of identified probe positional error. In particular, the size of the search area may be reduced if the probe positional error calculated in step 242 is less than a predetermined value, and the size of the search area may be increased if the identified probe positional error calculated in step 242 is greater than a predetermined value.

At step 240, a subsequent image may be generated from a subsequent local scan of least a portion of a previously defined search area. For example, the processor 30 may execute suitable image generation instructions stored in memory to generate the subsequent image from the subsequent local scan conducted in step 238.

At step 242, a subsequent image may be analyzed in an attempt to identify a reference characteristic and determine probe positional error. For example, as described in step 226, the processor 30 may execute suitable reference characteristic finding instructions and/or probe position error instructions stored in memory.

Also, or instead, the probe positional error may be determined in any other suitable manner. For instance, images generated from scans, such as a sequence of scans, may be compared to identify differences between positions of a reference characteristic in the images to determine the probe positional error. The sequence of scans may be a global scan and a first local scan, the first local scan and a subsequent local scan, the subsequent local scan and another subsequent local scan, or the like. Those skilled in the art will recognize that the terminology probe positional error essentially may be the same as specimen support positional error for reasons stated previously.

In one example, the positions of at least a portion of the reference characteristic $R_N$, $R_N'$ in images from steps 224 and 240 may be compared. More particularly, the reference characteristic $R_N$ in the image from step 224 and a shifted version of the reference characteristic $R_N'$ in the subsequent image from step 240 may be analyzed to identify a common actual or theoretical point C (and shifted version C') of the reference characteristic $R_N$, $R_N'$. More specifically, the processor 30 may execute suitable image analysis instructions to identify a centroid point of the reference characteristic, a center point of a box outlining the reference characteristic, or the like. Such points are common between the images and dimensional differences therebetween can be calculated as the probe positional error. Lateral X and Y axis distances between a centroid point of an image and a corresponding centroid point of a subsequent image can be determined.

In addition, the reference characteristic finding instructions may include adjustments for changes in the reference characteristic. This is because some reference characteristics change relatively rapidly, even as they are being analyzed. As one example, a circular topographical feature may morph into a kidney shaped topographical feature under certain conditions including temperature, force, applied power, or the like. Such transients may be relatively predictable and, in such cases, any suitable algorithms such as pattern matching algorithms may account for such predictable changes.

At step 243, it may be determined whether or not a reference characteristic has been identified. If so, the method proceeds to step 246, and if not, then the method proceeds to step 244

At step 244, if a reference characteristic is not identified in a subsequent image, then a search area may be enlarged and steps 238-243 may be repeated until the reference characteristic is identified again.

At step 246, a subsequent image may be stored if a reference characteristic is identified in the subsequent image. For example, the subsequent image generated in step 240 may be stored in memory if the reference characteristic is identified therein in step 242.

At step 250, one or more position offsets may be generated from a probe positional error. For example, the processor 30 may use the probe positional error determined in step 242 to generate the position offset(s). The position offset(s) may be a set of lateral X and Y axis dimensional values, such as $\Delta x$ and $\Delta y$ values with the same magnitude of the probe positional error values from step 242 but with opposite direction. Instead, the position offset values $\Delta x$ and $\Delta y$ may be greater than the error values from step 242, such as to correct for scanner creep. Similarly, the position offset values $\Delta x$ and $\Delta y$ may be lesser than the X and Y error values from step 242, such as to prevent overshoot. Such greater or lesser values may be generated by adding or subtracting predetermined adjustment values to or from the probe positional error values.

At step 251, one or more position offsets and/or one or more probe positional errors may be stored. For example, the offsets $\Delta x$ and $\Delta y$ from steps 231 or 250 and/or errors from steps 226 or 242 may be stored in the memory 32 of the computer 22, such as for later use in assessing validity of spectroscopy data, adjusting the offset calculation step, improving the design of a microscope, or the like.

At step 252, a probe may be moved to a target location as a function of determined probe positional error, such as using a position offset generated from the determined probe positional error. For example, the processor 30 may execute suitable probe movement instructions to generate suitable command signals for transmission from the computer 22 to the microscope 12 to actuate one or both of the scanners 18, 20 to move the probe 16 from its current location to one of the target locations $L_1$, $L_2$, $L_3$, or the like.

In so doing, the processor 30 may calculate nominal or gross lateral X and Y axis command signals and then adding, subtracting, multiplying, or dividing the position offset from step 250 with respect to the nominal command signals to yield adjusted or net lateral X and Y axis command signals. In one example, in the case of a move from the current location to the next target location, the probe is nominally commanded to move to the target location +/− the positional error offsets $\Delta x$ and $\Delta y$.

At step 253, it may be determined whether requested spectroscopy has been completed. If not, then the method may loop back to step 234, otherwise the method may proceed to step 254.

At step 254, stored spectroscopy data and associated images of a search area may be presented to a user. For example, the processor 30 may retrieve the data and image(s) stored in steps 228 and 236 from the memory 32 and transmit it via the interface(s) 36 to the output device(s) 28, such as a video display.

At step 256, at least one stored set of spectroscopic data may be discarded, for example, in response to a request received from a user based on a visual analysis of images by the user, or based on an insufficient degree of correlation, or the like.

The method 200 may also be implemented for more than one target location on the specimen surface. For example, if the user selects multiple target locations at once, such as $L_1$, $L_2$, $L_3$, ... $L_N$, the probe may be moved to the first location $L_1$ to and the method 200 may be carried out as described above. After the desired number of spectroscopic measurements are taken at that first location $L_1$, the probe will be moved to the next target location $L_2$, and the method 200 will carried out as described above for target location $L_2$. Similarly, after the desired number of spectroscopic measurements are taken at the second location $L_2$, the probe will be moved to the next target location $L_3$, and the method 200 will carried out as described above for target location $L_3$. This sequence may proceed automatically until all points $L_1$ through $L_N$ have been spectroscopically measured in accordance with the method 200.

The method 200 may also be implemented by automatically conducting the spectroscopic analyses as global scanning is being carried out. For example, a scan may be initiated for a global scan area and, at each of several pre-defined points, the scanning probe movement may be stopped and spectroscopic analysis conducted in accordance with any suitable portion(s) of the method 200. At the end of the global scan, an image may be generated that shows the exact position that the spectroscopic measurements were made.

As used in the sections above and claims below, the terms "for example," "for instance," and "such as," and the verbs "comprising," "having," "including," and their other verb forms, when used in conjunction with a listing of one or more components or other items, are each to be construed as open-ended, meaning that the listing is not to be considered as excluding other, additional components, elements, or items. Moreover, directional words such as front, rear, top, bottom, upper, lower, radial, circumferential, axial, lateral, longitudinal, vertical, horizontal, transverse, and the like are employed by way of description and not limitation. Other terms are to be construed using their broadest reasonable meaning unless they are used in a context that requires a different interpretation. When introducing elements of the present invention or the embodiments thereof, the articles "a," "an," "the," and "said" are intended to mean that there are one or more of the elements.

It is to be understood that the invention is not limited to the particular exemplary embodiments disclosed herein, but rather is defined by the claims below. In other words, the statements contained in the foregoing description relate to particular exemplary embodiments and are not to be construed as limitations on the scope of the invention as claimed below or on the definition of terms used in the claims, except where a term or phrase is expressly defined above. And although the present invention has been disclosed in conjunction with a limited number of presently preferred exemplary embodiments, many others are possible and it is not intended herein to mention all of the possible equivalent forms and ramifications of the present invention. Other modifications, variations, forms, ramifications, substitutions, and/or equivalents will become apparent or readily suggest themselves to persons of ordinary skill in the art in view of the foregoing description. In other words, the present invention encompasses many reasonable substitutions or equivalents of limitations recited in the following claims. Indeed, the present invention is intended to embrace all such forms, ramifications, modifications, variations, substitutions, and/or equivalents as fall within the spirit and broad scope of the following claims.

The invention claimed is:

1. A method of position control for scanning probe spectroscopy, comprising:
   (a) conducting a global scan of a specimen;
   (b) generating a global image from the global scan;
   (c) presenting the global image to a user;
   (d) receiving a request from the user for spectroscopic analysis of the specimen at a target location within the global scan area and with respect to a reference characteristic;
   (e) defining a reference area including at least a portion of the reference characteristic;
   (f) defining a search area including the reference area;
   (g) moving a probe to the search area;
   (h) conducting a local scan of the search area;
   (i) generating a local image of at least a portion of the search area from the local scan of the search area;
   (j) analyzing the local image to identify the reference characteristic;
   (k) determining probe positional error by comparing the global and local images to identify differences between positions of the reference characteristic in the images;
   (l) generating a position offset from the determined probe positional error;
   (m) moving the probe to the target location using the position offset generated from the determined probe positional error;
   (n) conducting a spectroscopic analysis of the specimen at the target location;
   (o) conducting a subsequent local scan of at least a portion of the search area;
   (p) generating a subsequent local image from the subsequent local scan of the at least a portion of the search area;
   (q) analyzing the subsequent local image to identify the reference characteristic; and
   (r) determining probe positional error by comparing the local images to identify differences between positions of the reference characteristic in the images.

2. The method of claim 1, further comprising: enlarging the search area if the reference characteristic is not identified in the local image; and
   repeating steps (h) through (I) until the reference characteristic is identified.

3. The method of claim 1, further comprising:
   storing at least a portion of the subsequent local image; and
   storing data from the spectroscopic analysis in association with the stored at least a portion of the subsequent local image as a confirmation of where the spectroscopic analysis was conducted.

4. The method of claim 1, further comprising:
   enlarging the search area if the reference characteristic is not identified in the subsequent local image; and
   repeating steps (o) through (q) until the reference characteristic is identified.

5. The method of claim 1, further comprising:
   presenting stored spectroscopy data and associated images of the search area to the user; and
   discarding at least one stored set of spectroscopic data.

6. The method of claim 1, wherein the reference area is defined by a user including at least one of a box around the reference characteristic or an outline of the reference characteristic.

7. The method of claim 1, wherein the reference area is defined by calculating an area smaller than the global scan area but greater than the area of the reference characteristic.

8. The method of claim 7, wherein the size of the reference area is defined as a function of at least one of the size of the global scan area or a distance between a current probe position and the target location.

9. The method of claim 1, wherein the size of the search area is defined as a function of at least one of the size of the global scan area, the size of the reference area, or a distance between a current probe position and the target location.

10. The method of claim 1, wherein the subsequent local image is analyzed by comparing at least one parameter value of a potential reference characteristic to a predetermined threshold value.

11. The method of claim 10, wherein the potential reference characteristic is identified as the reference characteristic if the compared parameter value is greater than or equal to the predetermined threshold value.

12. The method of claim 1, further comprising adjusting the size of the search area for subsequent spectroscopic analyses as a function of the determined probe positional error.

13. The method of claim 12, wherein the size of the search area is reduced if the determined probe positional error is less than a predetermined value, and increased if the determined probe positional error is greater than a predetermined value.

14. The method of claim 1, further comprising generating a position offset from the determined probe positional error.

15. The method of claim 14, further comprising moving the probe to the target location using the position offset generated from the determined probe positional error.

16. The method of claim 14, further comprising storing at least one of the position offset(s) or probe positional error(s).

17. The method of claim 1, further comprising:
    moving the probe during the spectroscopic analysis as a function of the determined probe positional error, to maintain the probe over the target location.

18. A method of position control for scanning probe spectroscopy, comprising:
    conducting a global scan of a specimen to define a global scan area;
    receiving a request for spectroscopic analysis at a target location of the specimen within the global scan area;
    defining a reference area that is associated with the target location and that includes at least a portion of a reference characteristic;
    defining a search area that is within the global scan area and that includes the reference area;
    conducting a scan of the search area of the specimen;
    spectroscopically analyzing the specimen with a probe at the target location;
    conducting a subsequent scan of the search area of the specimen;
    determining positional error of the probe by comparing a plurality of reference area images generated from at least two of the scans and identifying differences between positions of the reference characteristic in the images; and
    moving the probe to the target location for spectroscopic analysis, as a function of the determined probe positional error.

19. A method of position control for scanning probe spectroscopy, comprising:
    conducting a scan of a search area of a specimen;
    spectroscopically analyzing the specimen with a probe at a target location;
    conducting a subsequent scan of the search area of the specimen;

determining positional error of the probe by comparing a plurality of reference area images generated from at least one of the scans;

moving the probe to the target location for spectroscopic analysis, as a function of the determined probe positional error;

generating a baseline reference image from the scan of the search area; and setting average values of scan lines in a fast-scan direction of the baseline reference image to zero.

20. The method of claim 19, wherein the search area is of size SX, SY and the plurality of reference images are of size RX, RY, also wherein the determining positional error step includes: generating a plurality of reference area images obtained as deviations (dX, dY) from a search image origin for each value of dX greater than or equal to zero and less than (SX−RX), and for each value of dY greater than or equal to zero and less than (SY−RY);

setting average values of scan lines in a fast-scan direction of each of the reference area images to zero;

calculating an error function L(dX, dY) as equal to a sum of absolute values of differences between corresponding values of the baseline image and the reference area images; and selecting one of the plurality of reference area images having values of dX, dY that minimize the error function as a best fit sub-search image.

21. A method of position control for scanning probe spectroscopy, comprising:

conducting a global scan of a specimen;

conducting a local scan of the specimen;

comparing images generated from the scans to determine positional error of the probe based on differences between positions of a reference characteristic in the images; and moving the probe to a target location for spectroscopic analysis, as a function of the determined probe positional error.

22. A method of position control for scanning probe spectroscopy of a specimen, comprising:

determining probe positional error by comparing images generated from a sequence of scans to identify differences between positions of at least a portion of a reference characteristic of the specimen in the images; and moving a probe to a target location for spectroscopic analysis, as a function of the determined probe positional error.

23. The method of claim 22, wherein the method is automatically carried out for a plurality of target locations.

24. The method of claim 22, wherein the method is automatically carried out as a global scan is being conducted.

25. The method of claim 22, wherein the sequence of scans includes a global scan and a local scan.

26. The method of claim 22, wherein the sequence of scans includes local scans.

27. The method of claim 22, further comprising:

conducting a spectroscopic analysis of the specimen at the target location; and moving the probe during the spectroscopic analysis as a function of the determined probe positional error, to maintain the probe over the target location.

28. A computer-controlled system, comprising:

at least one input device to receive data;

at least one output device to present data;

a memory storing program instructions and data; and a processor coupled to the input and output device(s) and memory, and responsive to the program instructions for causing the computer-controlled system to perform a method according to claim 22.

29. A computer-readable medium comprising instructions executable by a computer-controlled scanning probe microscope system to cause the system to perform a method according to claim 22.

* * * * *